Figure 1:
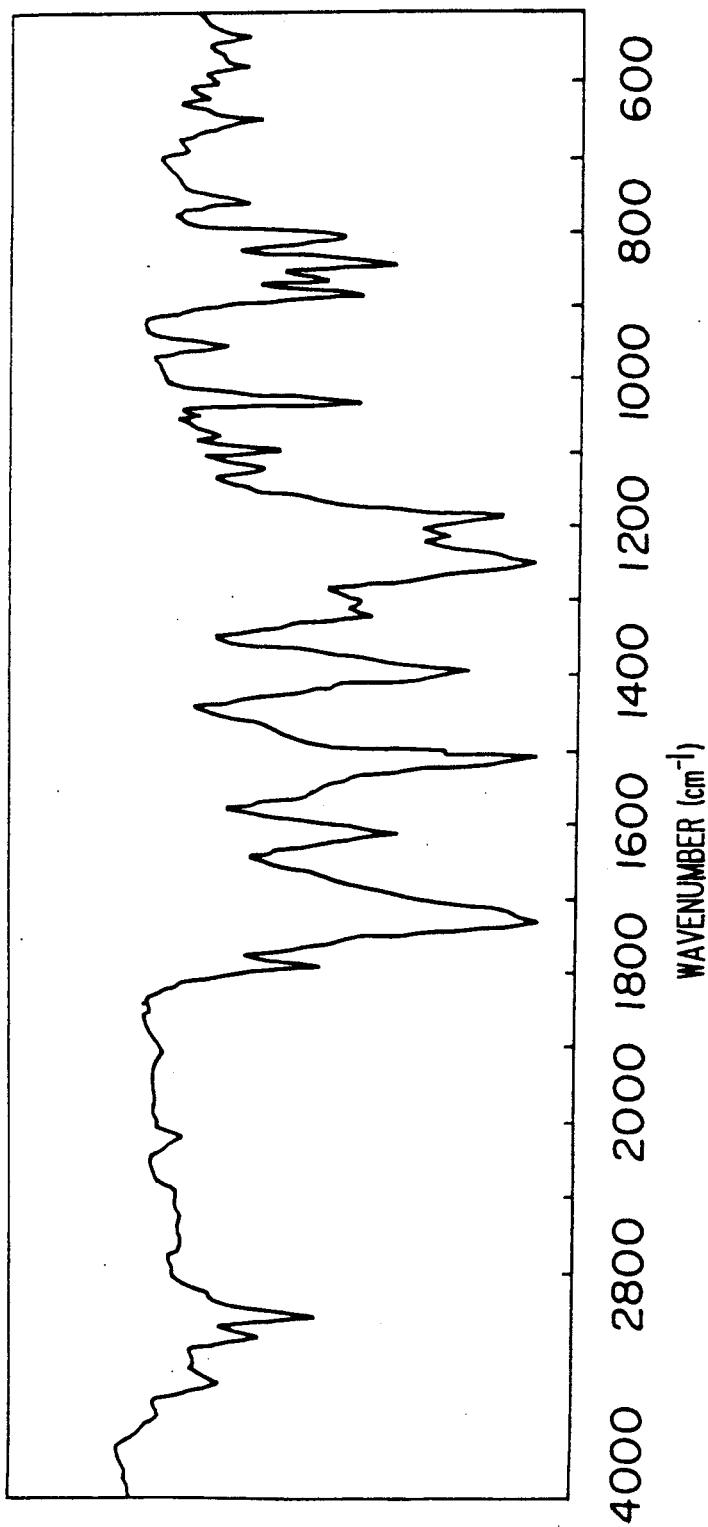

United States Patent [19]

Koto et al.

[11] Patent Number: 5,053,480
[45] Date of Patent: Oct. 1, 1991

[54] POLYIMIDE RESIN FROM CYCLOBUTANE TETRACARBOXYLIC ACID DIANHYDRIDE

[75] Inventors: Noriaki Koto; Toyohiko Abe, both of Ichihara; Hideo Suzuki; Kanji Otsuka, both of Funabashi, all of Japan

[73] Assignee: Nissan Chemical Industries Ltd., Tokyo, Japan

[21] Appl. No.: 503,104

[22] Filed: Apr. 2, 1990

Related U.S. Application Data

[63] Continuation of Ser. No. 342,866, Apr. 25, 1989, abandoned, which is a continuation of Ser. No. 621,234, Jun. 15, 1984, abandoned.

[30] Foreign Application Priority Data

Jun. 25, 1983 [JP] Japan .................... 58-114933

[51] Int. Cl.$^5$ .................... C08G 73/10
[52] U.S. Cl. .................... 528/188; 528/125; 528/128; 528/171; 528/172; 528/173; 528/185; 528/220; 528/229; 528/352; 528/353
[58] Field of Search .............. 528/188, 185, 353, 352, 528/220, 229, 171, 172, 173, 125, 128

[56] References Cited

U.S. PATENT DOCUMENTS 4,358,579 11/1982 Nimry et al. .................... 528/188

OTHER PUBLICATIONS

Nakanishi et al., Polymer, Sep. 1973, vol. 14, pp. 440–444.

Primary Examiner—Harold D. Anderson
Attorney, Agent, or Firm—Oblon, Spivak, McClelland, Maier & Neustadt

[57] ABSTRACT

A polyimide resin composed essentially of repeating units represented by the general formula:

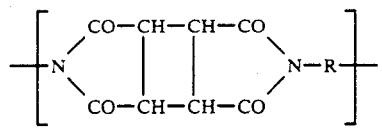

where R is a divalent aromatic hydrocarbon radical.

4 Claims, 2 Drawing Sheets

POLYIMIDE RESIN FROM CYCLOBUTANE TETRACARBOXYLIC ACID DIANHYDRIDE

This application is a continuation of application Ser. No. 07/342,866, filed on Apr. 25, 1989 which is a continuation of Ser. No. 06/621,234 filed June 15, 1984, both abandoned.

The present invention relates to a novel polyimide resin and a process for its preparation. More particularly, it relates to a novel polyimide resin which provides a molded product having excellent transparency with no substantial coloring and good heat resistance, and a process for its preparation.

Polyimide resins are linear polymers obtained by the reaction of an aromatic tetracarboxylic dianhydride such as pyromeritic dianhydride with an aromatic diamine, and they have not only high tensile strength, toughness, high insulation resistance and solvent resistance but also excellent heat resistance. Accordingly, they are suitable for use as heat resistant films, adhesives, molding resins, laminate resins or fiber materials. In recent years, there have been various applications to automobile parts, special machine parts, electric or electronic materials and space craft or air craft materials in view of such excellent characteristics.

On the other hand, these heat resistant aromatic polyimide resins have a deep amber color as one of the characteristics of the outer appearance.

In recent years, polyimide resins have been used as certain optical films or as display materials (such as alignment films for liquid crystal display devices). However, because of the color, the above-mentioned aromatic polyimides have a poor percent transmission of light, and they are not very useful for such applications and, in an extreme case, are not useful at all. In order to reduce the coloring, an attempt has been made to purify the material to high degree. However, no good results have been obtained.

As a method for reducing the coloring, it is known to react an aliphatic tetracarboxylic dianhydride with a diamine for the polymerization of a polyimide, whereby it is possible to obtain a polyimide having excellent transparency with a less degree of coloring. However, with such an aliphatic polyimide, the heat resistance tends to be extremely poor. Thus, such a method has a serious drawback that the heat resistance which is of the primary importance to the polyimide, is thereby lost.

It is also known to obtain a polyimide from cyclobutane tetracarboxylic acid dianhydride by reacting its half ester with an aliphatic diamine (Tabuchi et al., Journal of Industrial Chemistry, Vol. 67, No. 7, 92 (1964)). However, a polyimide having good quality has not yet been obtained by this method. The polyimide obtained from the aliphatic diamine is not solvent resistant, i.e. it is soluble in a solvent such as m-cresol.

Further, Japanese Examined Patent Publication No. 6793/1971 discloses a polyimide prepared by solution polymerization of cyclopentane tetracarboxylic acid dianhydride with an aromatic diamine. However, the polyimide obtained by this method is soluble (i.e. not solvent resistant) in a polar solvent such as N-methylpyrolidone or dimethylformamide.

The present inventors have conducted extensive researches with an aim to overcome the conventional drawbacks and to provide a polyimide resin having excellent transparency without coloring and good heat resistance. As a result, it has been found that a polyimide resin obtainable by the reaction of a specific alicyclic tetracarboxylic dianhydride with an aromatic diamine, has no substantial coloring, excellent transparency and good heat resistance. The present invention has been accomplished based on this discovery.

Namely, the present invention provides a polyimide resin composed essentially of repeating units represented by the general formula:

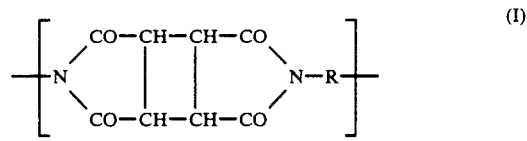

where R is a divalent aromatic hydrocarbon radical.

The present invention also provides a process for preparing such a polyimide resin, which comprises polycondensing a tetracarboxylic dianhydride composed essentially of cyclobutane-1,2:3,4-tetracarboxylic dianhydride represented by the formula:

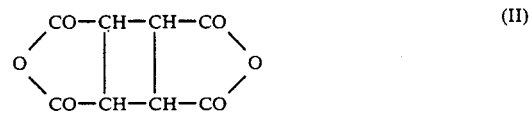

with a diamine composed essentially of an aromatic diamine represented by the general formula:

$$NH_2-R-NH_2 \quad (III)$$

where R is as defined above, followed by dehydrating cyclization.

Now, the present invention will be described in detail with reference to the preferred embodiments.

In the accompanying drawings,

FIG. 1 shows an infrared absorption spectrum of the polyimide resin obtained in Example 2 according to the present invention.

Figure 2:
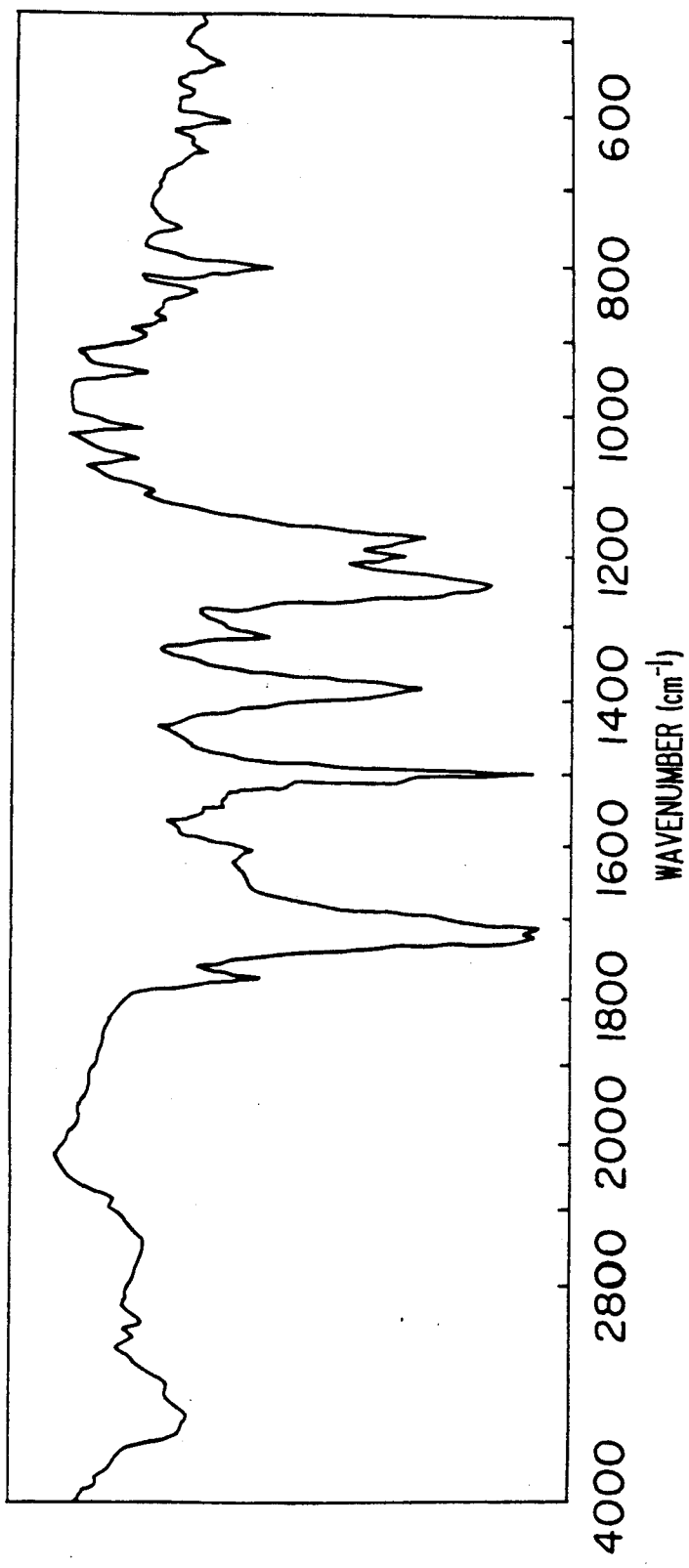

FIG. 2 likewise shows an infrared absorption spectrum of the polyimide resin obtained in Example 4 according to the present invention.

The polyimide resin of the present invention is composed essentially of the repeating units represented by the general formula I where R is a divalent aromatic hydrocarbon radical such as

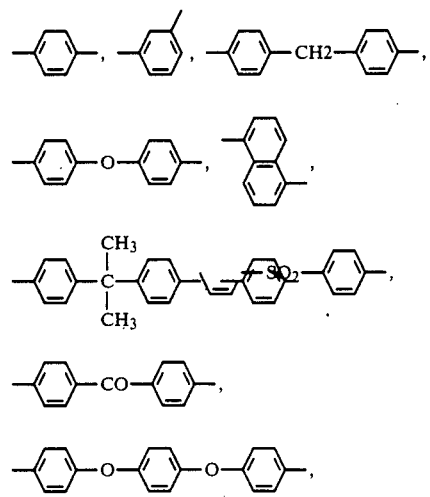

-continued

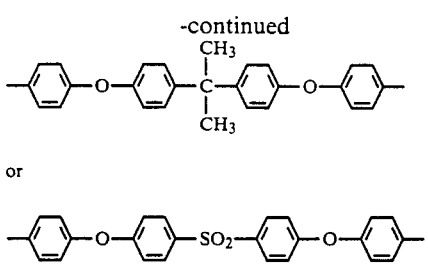

or

In order to attain the objects of the present invention i.e. excellent transparency and good heat resistance, the polyimide resin should contain at least 90 mol % of the repeating units represented by the general formula I. However, the polyimide resin may contain other repeating units such as aliphatic imide units, aromatic imide units and alicyclic imide units other than those represented by the general formula I, in a proportion of less than 10 mol % i.e. to such an extent that they do not impair the transparency or heat resistance of the resin.

The polyimide resin obtainable by the reaction of the above-mentioned specific alicyclic tetracarboxylic dianhydride with an aromatic diamine, will have a molecular weight high for the fabrication into a film. The film thereby obtained will have no substantial coloring and excellent transparency. In contrast with a usual aliphatic polyimide, it has a feature that it has extremely high heat resistance. Further, it has various advantages including excellent chemical resistance whereby it is hardly susceptible or highly resistant to various chemicals such as organic solvents, acids or alkalis.

Thus, the polyimide resin of the present invention has excellent transparency and good heat resistance and chemical resistance, and are particularly useful for e.g. display materials (such as a base film for a transparent conductive coating or an alignment film for a liquid crystal display device). Further, it may be applied to films, sheets, enamels, laminates, adhesives, laminating agents, etc.

There is no particular restriction to the method for the synthesis of the compound represented by the formula II to be used as a starting material in the process of the present invention. For instance, the compound of the formula II may be prepared by a method disclosed in Tetrahedron Letters, 3, 13 (1969).

In order to attain the objects of the present invention, at least 90 mol % of the tetracarboxylic acid dianhydride should be composed of the compound of the formula II. The tetracarboxylic dianhydride may partially contain other tetracarboyxlic dianhydrides, e.g. aromatic carboxylic dianhydrides such as pyrometritic dianhydride or benzophenone tetracarboxylic dianhydride, or aliphatic tetracarboxylic dianhydrides such as butane tetracarboxylic dianhydride, so long as they do not impair the excellent transparency and heat resistance of the resin.

The aromatic diamine of the formula III to be used in the present invention is not particularly limited and may be any aromatic diamine so long as it does not impair the objects of the present invention. The typical examples include p-phenylene diamine, m-phenylene diamine, diamino diphenylmethane, diamino diphenyl ether, 2,2-diamino diphenyl propane, diamino diphenyl sulfone, diamino benzophenone, diamino naphthalene, 1,3-bis(4-aminophenoxy)benzene, 1,4-bis(4-aminophenoxy)benzene, 4,4'-di(4-aminophenoxy)diphenyl sulfone and 2,2'-bis[4-(4-aminophenoxy)phenyl]propane. These aromatic diamines are used in an amount of at least 90 mol %. They may be used alone or in combination as a mixture of two or more different kinds. Further, it is naturally preferred to properly select these aromatic diamines to impart desired properties depending upon the particular use of the polyimide of the present invention. For this purpose, the aromatic diamine to be used for the present invention may partially be substituted by e.g. an aliphatic diamine or an alicyclic diamine.

It is particularly important to use at least 90 mol % of the aromatic diamine to impart the heat resistance of the polyimide resin, which is one of the important features of the present invention. If the amount of the aromatic diamine is less than 90 mol %, no adequate transparency or heat resistance intended by the present invention, will be obtainable.

The polyimide of the present invention is prepared by polycondensing at least 90 mol % of the tetracarboxylic dianhydride of the formula II with the aromatic diamine of the formula III to form so-called polyamic acid, which is then subjected to dehydrating cyclization to obtain a polyimide. There is no particular restriction to the method for the polymerization. Any one of solution polymerization, interfacial polymerization, bulk polymerization and solid phase polymerization, may be employed. The polymerization reaction may be conducted in a single step method wherein the formed polyamic acid is converted to the polyimide without being isolated. Or, there may be employed a two step method wherein the formed polyamic acid is isolated, and then subjected to dehydrating cyclization to form a polyimide.

Further, when less than 90 mol % of the tetracarboxylic dianhydride of the formula II is employed, no adequate heat resistance or transparency of the resin is obtainable.

As the polymerization method for the present invention, it is usually preferred to employ a solution polymerization. As a solvent to be used for the solution polymerization, any solvent may be employed so long as it is capable of dissolving the resulting polyamic acid. Typical examples include N,N-dimethylformamide, N,N-dimethylacetoamide, N-methyl pyrclidone, N-methyl caprolactam, dimethyl sulfoxide, tetramethyl urea, pyridine, dimethyl sulfone, hexamethyl phosphoramide and butyrolactone. These solvents may be used alone or in combination as a mixture. Further, a solvent which is incapable of dissolving the polyamic acid, may be added to the above solvent so long as the polyamic acid is soluble in the mixture of the solvents.

In the polymerization of the present invention, the tetracarboxylic dianhydride of the formula II is reacted with the aromatic diamine of the formula III in a molar ratio of from 0.5 to 2, preferably from 0.9 to 1.1. Like in a usual polycondensation reaction, the molecular weight of the resulting polyamic acid tends to be greater as the molar ratio of these two components becomes closer to 1. The temperature for the polycondensation reaction for the formation of the polyamic acid is optionally selected within a range of from −20° to 150° C., preferably from −5° to 100° C.

For the conversion of the polyamic acid to the polyimide in the present invention, it is usual to employ a method wherein dehydrating cyclization is conducted by heating. The temperature for this dehydrating cyclization by heating is optionally slected within a range of from 150° to 400° C., preferably from 170° to 350° C.

The time required for the dehydrating cyclization is usually from 30 seconds to 10 hours, preferably from 5 minutes to 5 hours, although the reaction time depends on the above-mentioned reaction temperature. As another method for the conversion of the polyaxic acid to the polyimide, it is also possible to employ a method wherein the cyclization is chemically conducted by means of a catalyst for dehydrating cyclization. As such a method, there may be employed a known method which is commonly employed in the synthesis of polyimides, and there is no particular restrictions as to the reaction conditions.

Now, the present invention will be described in further detail with reference to Examples. However, it should be understood that the present invention is by no means restricted to these specific Examples. The determinations of the transparency and the heat resistance of polyimides were conducted in accordance with the following methods.

1) Percent transmission

The percent transmission of parallel rays was measured by means of a digital color difference meter manufactured by Suga Shikenki K.K.

2) Thermal decomposition temperature

The thermogravimetric analysis was conducted in a nitrogen stream at a temperature raising rate of 10° C./min by means of DD5/560 Model Thermogravimetric Analyzer manufactured by Daini Seikosha K.K., and the temperature at which the weight reduction was 5%, was taken as the thermal decomposition temperature.

3) Viscosity

The viscosity was measured in the form of an N,N-dimethylformamide solution containing 0.5% by weight of the solid content, at 30° C. by means of Ubbelohde's viscometer.

EXAMPLE 1

14.4 g of 2,2-bis[4-(4-aminophenoxy)phenyl]propane was added to 202 ml of N,N-dimethylformamide, and stirred to obtain a uniform solution. To the solution, 6.9 g of cyclobutane-1,2:3,4-tetracarboxylic dianhydride was added, and the mixture was stirred for 6 hours, whereupon a slightly brownish viscous liquid was obtained. This viscous liquid was precipitated in a great amount of toluene, whereby 2.9 g of light yellow solid was obtained. This solid was confirmed to be polyamic acid by the infrared spectrum. Further, this solid was dissolved in N,N-dimethylformamide, and the viscosity was measured, whereby reduced viscosity was found to be $\eta sp/C = 2.7$ dl/g.

EXAMPLE 2

3 g of the polyamic acid obtained in Example 1 was dissolved in 18 ml of N,N-dimethylformamide. The viscous liquid thereby obtained was cast on a glass plate in a thickness of 75 μm by means of a doctor knife, and dried at 80° C. for 10 minutes, at 150° C. for 15 minutes and at 250° C. for 1 hour, whereupon a uniform film having a thickness of 10 μm was obtained. The infrared spectrum (FIG. 1) of this film showed characteristic absorption of a five membered imide ring at 1770 cm$^{-1}$ and 1700 cm$^{-1}$. Thus, it was confirmed that the film was made of a polyimide having the following structure.

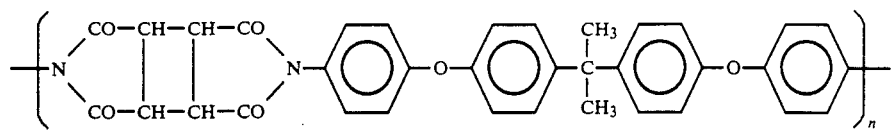

Further, this film was colorless and had excellent transparency and toughness.

EXAMPLE 3

20.5 g of 2,2-bis[4-(4-aminophenoxy)phenyl]propane was added to 289 ml of N,N-dimethylformamide, and stirred to obtain a uniform solution To this solution, 9.8 g of cyclobutane-1,2:3,4-tetracarboxylic dianhydride was added, and the mixture was stirred at room temperature for 8 hours. The viscous liquid thereby obtained had a reduced viscosity of $\eta sp/C = 2.8$ dl/g. This viscous liquid was cast on a glass plate in a thickness of 600 μm by means of a doctor knife, and dried at 80° C. for 15 minutes, at 150° C. for 15 minutes and at 250° C. for 1 hour. The film thereby obtained was slightly brownish and had excellent transparency. From the infrared spectrum, it was confirmed that the conversion to the polyimide was 100%.

EXAMPLE 4

6.0 g of diaminodiphenyl ether was added to 113 ml of N,N-dimethylformamide, and stirred to obtain a uniform solution. To the solution, 5.9 g of cyclobutane-1,2:3,4-tetracarboxylic dianhydride, and the mixture was stirred for 8 hours at room temperature, whereupon a viscous liquid having a reduced viscosity of $\eta sp/C = 2.1$ dl/g was obtained. This viscous liquid was cast on a glass plate in a thickness of 600 μm by means of a doctor knife, and dried at 80° C. for 15 minutes, at 150° C. for 15 minutes and at 250° C. for 1 hour. The film thereby obtained was slightly brownish and had excellent transparency. From the infrared spectrum (FIG. 2), it was found to be a polyimide having the following structure.

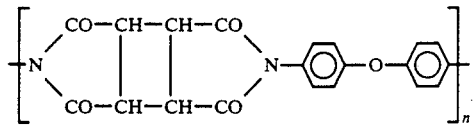

EXAMPLE 5

A polyamic acid solution was prepared in the same manner as in Example 4 except that diaminodiphenyl methane was used instead of diaminodiphenyl ether, whereby a solution having a reduced viscosity of $\eta sp/C = 2.3$ dl/g was obtained. This solution was formed into a film in the same manner as in Example 4. The film was found to be a polyimide having the following structure.

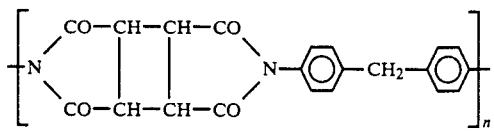

EXAMPLE 6

8.0 g of diaminodiphenyl ether was added to 156 ml of N,N-dimethylformamide, and stirred to obtain a uniform solution. To the solution, 7.06 g of cyclobutane-1,2:3,4-tetracarboxylic dianhydride and 1.28 g of benzophenone tetracarboxylic dianhydride were added, and the mixture was stirred for 6 hours at room temperature, whereupon a viscous liquid having a reduced viscosity of $\eta sp/C = 1.6$ dl/g was obtained. This viscous liquid was cast on a glass plate in a thickness of 600 μm by means of a doctor knife, and dried at 80° C. for 15 minutes, at 150° C. for 15 minutes and at 250° C. for 1 hour. The film thereby obtained was slightly yellowish and had excellent transparency. From the infrared spectrum, it was confirmed that the conversion to the imide was 100%.

COMPARATIVE EXAMPLE 1

A polyamic acid solution was prepared in the same manner as in Example 3 except that dianhydride was used instead of cyclobutane-1,2:3,4-tetracarboxylic dianhydride, whereby a slightly yellowish brown viscous liquid was obtained. This viscous liquid had a reduced viscosity of $\eta sp/C = 2.6$ dl/g. This viscous liquid was formed into a film in the same manner as in Example 3, whereby a uniform film having a deep yellow color was obtained.

COMPARATIVE EXAMPLE 2

A polyamic acid solution was prepared in the same manner as in Example 4 except that pyromeritic dianhydride was used instead of cyclobutane-1,2:3,4-tetracarboxylic dianhydride, whereby a yellowish brown viscous liquid was obtained. This liquid had a reduced viscosity of $\eta sp/C = 3.2$ dl/g. This liquid was formed into a film in the same manner as in Example 3, whereby a uniform film having a deep yellow brown color was obtained.

EXAMPLE 7

The transparency and heat resistance of the films obtained in Examples 3, 4, 5 and 6 were measured, and the results are shown in Table 1. For the purpose of comparison, similar measurements were made with respect to the films obtained in Comparative Examples 1 and 2. As shown in Table 1, the films obtained in Examples 3, 4 and 5 had a percent transmission of at least 80%, thus indicating excellent transparency, and they also had a thermal decomposition temperature around 450° C., thus indicating high heat resistance.

TABLE 1

| Structure | Percent transmission (%) | Thermal decomposition temperature (°C.) |
| --- | --- | --- |
| Example 3 | 85.8 | 454 |
| Example 4 | 82.1 | 456 |
| Example 5 | 81.0 | 452 |
| Example 6 | 80.2 | 478 |
| Comparative Example 1 | 63.9 | 473 |
| Comparative Example 2 | 48.0 | 530 |

Film thickness: 50 μm

We claim:

1. A polyimide resin which exhibits no substantial coloring consisting of repeating units represented by the formula:

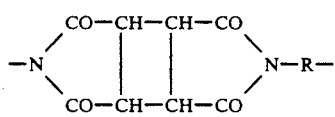 (I)

wherein R is a divalent aromatic hydrocarbon radical selected from the group consisting of:

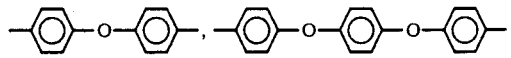

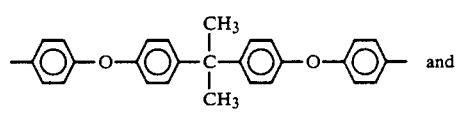 and

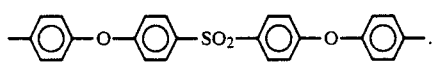

2. The polyimide resin according to claim 1, wherein R is

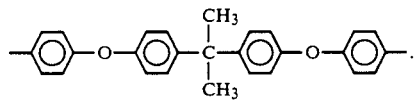

3. A polyimide resin which exhibits no substantial coloring consisting of at least two different repeating units of at least 90 mole % of repeating units of formula (I):

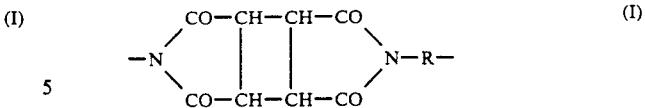 (I)

and less than 10 mole % of aliphatic imide units, aromatic imide units or alicyclic imide units not including the units of formula (I) wherein R is a divalent aromatic hydrocarbon radical selected from the group consisting of:

,

,

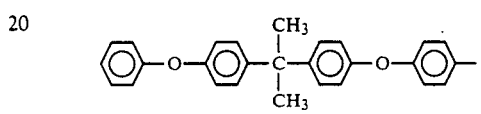

and

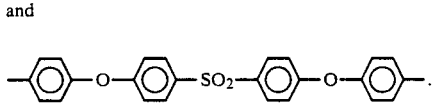.

4. The polyimide resin of claim 3, wherein said aromatic imide units are from pyromellitic anhydride or benzophenone tetracarboxylic dianhydride wherein said less than 10 mole % repeating units are aliphatic imide units.

* * * * *